Figure 1:
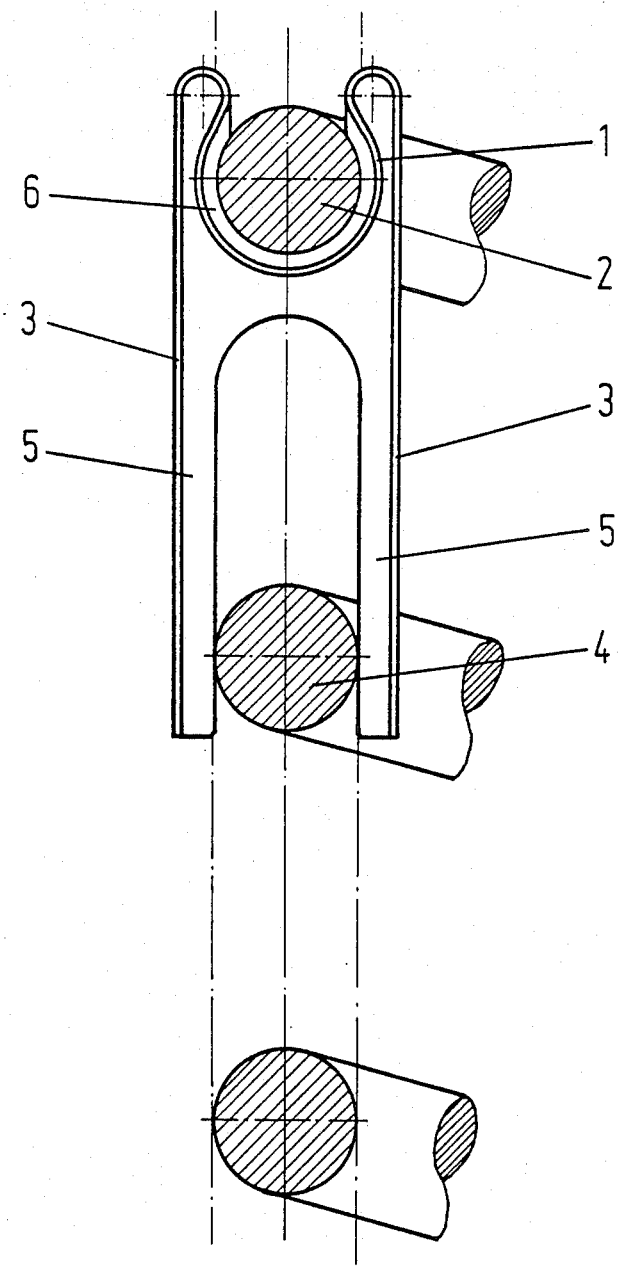

United States Patent [19]

Idigkeit et al.

[11] Patent Number: 4,779,854
[45] Date of Patent: Oct. 25, 1988

[54] VIBRATION DAMPER FOR HELICAL COIL SPRING INCLUDING CLIP WITH LUG PORTIONS

[75] Inventors: Werner Idigkeit; Benno Jörg, both of Weinheim; Heinz Seifert, Laudenbach, all of Fed. Rep. of Germany

[73] Assignee: Firma Carl Freudenberg, Weinheim/Bergstr., Fed. Rep. of Germany

[21] Appl. No.: 99,482

[22] Filed: Sep. 22, 1987

Related U.S. Application Data

[60] Division of Ser. No. 25,301, Mar. 13, 1987, Pat. No. 4,726,574, which is a continuation of Ser. No. 791,408, Oct. 25, 1985, abandoned.

[30] Foreign Application Priority Data

Dec. 1, 1984 [DE] Fed. Rep. of Germany ....... 3443910

[51] Int. Cl.$^4$ .................... B60G 13/00; B60G 15/00; F16F 7/00; F16F 9/00
[52] U.S. Cl. .................................. 267/204; 267/166; 267/286; 267/287
[58] Field of Search .............................. 267/196–216, 267/195, 286–291, 166–180, 181, 90, 28, 29, 53, 66, 275, 81, 89, 25–27, 182; 188/129

[56] References Cited

U.S. PATENT DOCUMENTS

| | | | |
|---|---|---|---|
| 3,034,777 | 5/1962 | Osterhoudt | 267/287 X |
| 3,198,508 | 8/1965 | Melton et al. | 267/287 |
| 3,591,161 | 7/1971 | Scheublein, Jr. et al. | 267/287 |
| 3,674,250 | 7/1972 | Joseph | 267/287 |
| 3,804,447 | 4/1974 | Slavin | 267/287 X |
| 3,866,724 | 2/1975 | Hollnagel | 267/209 X |
| 4,098,498 | 7/1978 | Da Silva | 267/287 |
| 4,538,563 | 9/1985 | Mayers | 267/166 X |
| 4,614,333 | 9/1986 | Gaylord | 267/287 |
| 4,726,574 | 2/1988 | Idigkeit et al. | 267/204 |

FOREIGN PATENT DOCUMENTS 187047 12/1963 Sweden ............................ 267/287

Primary Examiner—Douglas C. Butler
Attorney, Agent, or Firm—Felfe & Lynch

[57] ABSTRACT

A vibration damper for bodies which extend substantially parallel to one another, consisting of a clip made of a permanently elastic material and adapted to be slipped undislodgeably onto one of the bodies, and of at least two lugs projecting therefrom in the direction of at least one further body which clasp the latter with elastic initial tension, permitting relative displacement.

5 Claims, 2 Drawing Sheets

VIBRATION DAMPER FOR HELICAL COIL SPRING INCLUDING CLIP WITH LUG PORTIONS

This is a division application of application Ser. No. 025,301, filed Mar. 13, 1987, now U.S. Pat. No. 4,726,574 which is a continuation application of application Ser. No. 791,408, filed Oct. 25, 1985 now abandoned.

This invention relates to a vibration damper for bodies which extend substantially parallel to one another, as, for example, the individual turns of a helical spring.

When high-frequency vibrations are introduced into helical springs made of steel or similar materials, resonances may develop. For example, a spring which resiliently supports the body of a vehicle on its chassis is excited by frequencies ranging from 0 to about 1000 Hz over the full running-speed range of the vehicle. Because of the dimensions of such springs, which are dictated by considerations of installation, several characteristic modes of vibration occur in them. When the exciting frequency coincides with one of these characteristic frequencies, the vibrations introduced into the vehicle body are amplified by the spring. Since the materials of construction of these springs have very little inherent damping, the resonances occur nearly undamped and produce unpleasant noise peaks in the motor vehicle. Similar effects are often observed in other applications, too.

Attempts to minimize such resonance effects by jacketing the springs with damping materials yield only modest improvements since the damping forces so produced are too small or make it necessary to considerably change the external dimensions of the body to be damped.

An object invention thus is to provide a vibration damper of simple construction for the application outlined at the outset which makes it possible to produce large damping forces between at least two bodies which are movable relative to each other, without appreciably affecting the basic properties of said bodies, for example, the turns of a spring.

In accordance with the invention, this object is accomplished by means of a vibration damper for bodies which extend substantially parallel to one another, comprising a clip portion made of a permanently elastic material and adapted to be slipped transversely and undislodgeably onto one of said bodies, and at least two lug portions projecting therefrom in the direction of at least one further body which clasp the latter with elastic initial tension, permitting relative displacement.

The vibration damper of the invention thus comprises a clip which can be fixedly mounted on one of the bodies whose vibrations are to be damped. It has been found advantageous to make the clip resilient. This permits it to be secured to the perpendicularly extending body simply by slipping it onto said body.

In cases where the motion of only two bodies extending parallel to each other is to be damped, it has proved advantageous to have the lugs project from the clip in the same direction and clasp the adjacent body with elastic initial tension from opposite sides. The initial-tension forces exerted by the lugs on the adjacent body then cancel each other out so that no forces are transmitted outwardly.

Conversely, in applications where the vibrations of more than two adjacent bodies are to be damped, it has been found advantageous for the lugs to project from the clip in opposite directions and bear with elastic initial tension on further adjacent bodies from both sides. In this case, the further bodies need not be clasped by the lugs in U fashion; basically, a one-sided design will suffice. It can be produced at lower cost but of course is less effective.

The clip may consist of two partial clips adapted to be joined together along a plane extending parallel to an axial line which centrally intersects the bodies in their entirety. This design is particularly appropriate in cases where very little space is available for installation.

The effectiveness of the vibration damper of the invention is due mainly to the frictional losses which occur in a relative displacement between the lugs and the further bodies. A covering on the lugs that increases the friction has proved advantageous in this respect. It is preferably a friction lining of the type used with brakes. Good results have also been obtained by using a coating of elastomeric polyurethane.

The clip and the lugs may be of one-piece construction and pass into one another. The clip and the lugs then are best made of spring steel.

To secure the clip particularly well to the body onto which it is snapped, it is advantageously provided on the side facing said body with a layer that increases the static friction, for example, a layer of an elastomeric material. The latter should not be excessively hard so that it will penetrate well into minute surface irregularities of the associated body.

Figure 2:
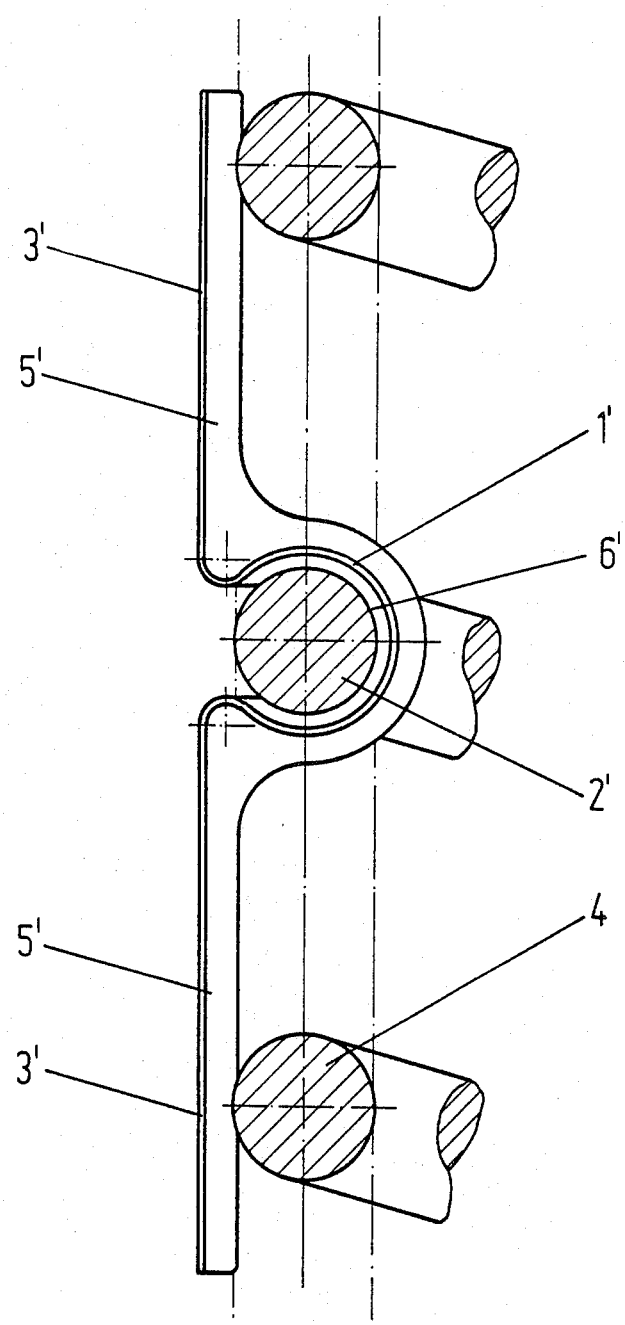

Two exemplary embodiments of the vibration damper of the invention are illustrated in the accompanying drawings, FIG. 1 shows a vibration damper in which the clip is provided with lugs projecting in the same direction and clasping the adjacent body from opposite sides; and FIG. 2 shows an embodiment in which lugs projecting from the clip in opposite directions bear on one side of the surface of bodies located in either direction.

The vibration damper shown in FIG. 1 comprises a clip 1 which is snapped onto a turn 2 of a helical spring and clasps an adjacent turn 4 of the spring from opposite sides by means of two lugs 5 projecting in the same direction. The lugs and the clip preferably are formed as one piece from a sheet of spring steel 3 and on the sides facing the turns of the spring preferably are provided with a coating 6 of elastomeric polyurethane. As a result, frictional forces are produced when there is relative motion between the adjacent turns of the spring. The clip 1 and lug portions 5 are integral with one another.

The embodiment shown in FIG. 2 is similar in construction to the one just described, similar portions having similar reference numerals primed; however, here the lugs 5', also integral with the clip 1', project from the latter in opposite directions. Here, too, the lugs and the clip preferably are provided with a surface coating 6' of polyurethane. The damping action achieved is due also in this case to frictional forces between the polyurethane coating and the adjacent turns of the spring when there is relative motion between them.

By judiciously placing several vibration dampers of the type described on a helical spring, resonance effects can be considerably damped and the transmission behavior of the spring therefore markedly improved. The number of vibration dampers to be used will depend on the frequencies and characteristic modes of vibration to be damped. For example, if only the first characteristic mode of vibration is within the operating range, two clips may suffice for the adequate damping of the spring.

The dimensions of the vibration damper may vary according to its use. Suitable materials of construction are metals and plastics with or without a layer of an appropriate friction-damping material.

Suggested applications are: The damping of helical springs, bars, ropes or pipes and similar structural parts vibrating relative to one another, perpendicular to their longitudinal axes; and the damping of relative vibrations between plates and bars, ropes, pipes and similar structural parts.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. The combination comprising:
   a vibrating helical spring having turns which extend substantially parallel to one another; and
   a vibration damper for said turns of said spring comprising a clip portion made of permanently elastic metal and including a side facing one of said turns and including means for clasping said clip portion undislodgeably onto said one of said turns, and at least two lug portions each made of said permanently elastic metal and each including at least an inner side and being straight only and projecting from said clip portion in the same direction and each lug portion projecting in the direction of at least one further turn associated therewith between said lug portions and each lug portion extending beyond said at least one further turn associated therewith, each of said lug portions having an inner side facing and bearing on said at least one further turn associated therewith from said inner side of said each lug portion movably with elastic inherent tension, permitting relative displacement of said at least one further turn associated therewith with respect to said each lug portion slidably by direct frictional engagement, said permanently elastic metal of said clip portion and at least one of said lug portions being of one-piece construction, and said clip portion and said lug portions including a friction-increasing layer of elastomeric material on said sides facing said turns.

2. A vibration damper according to claim 1, in which said layer is formed of elastomeric polyurethane.

3. A vibration damper according to claim 1, in which said clip and lug portions are integral with one another.

4. A vibration damper according to claim 3, in which said clip and lug portions are made of spring steel.

5. A vibration damper according to claim 1, in which said layer is formed of a soft, elastomeric material.

* * * * *